United States Patent
Liu

(10) Patent No.: US 10,962,664 B2
(45) Date of Patent: Mar. 30, 2021

(54) METHOD FOR ASSESSING A PERFORMANCE-BASED SEISMIC DESIGN BY SETTING A SEISMIC RISK

(71) Applicant: Qingdao University of Technology, Qingdao (CN)

(72) Inventor: Wenfeng Liu, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 0 days.

(21) Appl. No.: 16/652,419

(22) PCT Filed: Oct. 27, 2018

(86) PCT No.: PCT/CN2018/112248
§ 371 (c)(1),
(2) Date: Mar. 31, 2020

(87) PCT Pub. No.: WO2019/192166
PCT Pub. Date: Oct. 10, 2019

(65) Prior Publication Data
US 2020/0292721 A1 Sep. 17, 2020

(30) Foreign Application Priority Data

Apr. 2, 2018 (CN) .......................... 201810281664.8

(51) Int. Cl.
*G01V 1/00* (2006.01)
*G01V 1/30* (2006.01)
*G06N 7/00* (2006.01)

(52) U.S. Cl.
CPC .............. *G01V 1/008* (2013.01); *G01V 1/303* (2013.01); *G01V 1/306* (2013.01); *G06N 7/005* (2013.01); *G01V 2210/1232* (2013.01); *G01V 2210/6222* (2013.01)

(58) Field of Classification Search
None
See application file for complete search history.

(56) References Cited

U.S. PATENT DOCUMENTS

| | | | |
|---|---|---|---|
| 2001/0029432 A1* | 10/2001 | Gidwani | G01V 1/008 702/15 |
| 2012/0310607 A1* | 12/2012 | Liu | G01V 1/003 703/1 |
| 2014/0324356 A1* | 10/2014 | Park | G01M 5/0066 702/15 |
| 2016/0378886 A1* | 12/2016 | Shin | G06F 30/13 703/1 |
| 2020/0025957 A1* | 1/2020 | Guo | G06Q 50/08 |

FOREIGN PATENT DOCUMENTS

| | | |
|---|---|---|
| CN | 102966196 A | 3/2013 |
| CN | 106049951 A | 10/2016 |
| CN | 107784154 A | 3/2018 |
| JP | 2001349776 A | 12/2001 |
| JP | 2011094394 A | 5/2011 |

* cited by examiner

*Primary Examiner* — Lina M Cordero
(74) *Attorney, Agent, or Firm* — Bayramoglu Law Offices LLC

(57) ABSTRACT

A method for assessing a performance-based seismic design by setting a seismic risk starts from the exceedance probability of the performance level. The method is configured to determine the structural performance level by setting an exceedance probability, determine the seismic demand when the performance level is constant, set the exceedance probability of the seismic demand in combination with the seismic risk of a set earthquake to finally determine the ground motion input and establish a novel probabilistic seismic risk assessment method that reaches the performance level. The main control and objective of the design are significantly enhanced by using this method.

7 Claims, No Drawings

METHOD FOR ASSESSING A PERFORMANCE-BASED SEISMIC DESIGN BY SETTING A SEISMIC RISK

CROSS REFERENCE TO THE RELATED APPLICATIONS

This application is the national phase entry of International Application No. PCT/CN2018/112248, filed on Oct. 27, 2018, which is based upon and claims priority to Chinese Patent Application No. 201810281664.8, filed on Apr. 2, 2018, the entire contents of which are incorporated herein by reference.

TECHNICAL FIELD

The present disclosure relates to the technical field of seismic design, and specifically to a method for assessing a performance-based seismic design by setting a seismic risk.

BACKGROUND

At least one prior probabilistic seismic risk analysis of performance-based seismic design is based on the theory of total probability. Under that framework, which was authored by Cornell, Krawinkler (2000), and Moehle, Deierlein (2004), four elements are considered, including seismic hazard analysis, structural response analysis, damage analysis, and loss assessment. These elements are, in turn, linked through a conditional probability according to four indicators—ground motion intensity measures (IM), engineering demand parameters (EDP), damage measures (DM), and decision variables (DV)—to accomplish the performance-based seismic analysis. This framework has become recognized as the benchmark for the next-generation performance-based seismic design (FEMA 445, 2006).

The next-generation performance-based seismic design is a total-probability seismic hazard analysis design. Still in its formative stage, the design is characterized by numerous uncertainties, or variables, that remain difficult to quantify, such as ground motion uncertainty, structural uncertainty, uncertainty in the construction process, and incomplete knowledge. Thus, more research is needed. The probabilistic seismic risk analysis method has the following shortcomingss: (1) The total-probability seismic hazard analysis is based on the probability of earthquake occurrence to perform the seismic hazard analysis, probabilistic seismic demand analysis, and probabilistic seismic capability analysis to finally determine the probability of achieving a certain level of performance without starting from a "performance-based" method for calculating seismic hazards. This is not completely consistent with the original purpose of the "performance-based seismic design." Starting from the "performance-based level" is to grasp the design from the final result, and the main control and objective of the design are significantly enhanced. The "performance-based" seismic design method is stalled, however, because several key technologies of this design method have not been solved. (2) For at least three reasons, seismic engineering analysis is not easily combined with seismic design methods. First, there is a lack of a "performance-based" method for extracting the seismic actions and corresponding ground motion intensity. Second, the "performance-based" multimodal collaborative design technology, i.e. the technology of extracting the response spectrum intensity and selecting the ground motion in the multimodal space based on the "performance level", has not been developed. Third, the "probabilistic performance level" has not been developed, and the conditional probability chain has not been established to form the design method. (3) Design specifications are shifting from model specifications to performance specifications, and the performance specifications only specify the minimum performance objective requirements and design processes to ensure public safety. Other "personalized" and "diversified" performance objectives and corresponding design processes are determined by the designer and owner to obtain enhanced objectives (version 2.03 (2017)). The assessment methods for seismic design beyond the development specifications are indispensable and thus have a high potential social demand. Moreover, according to China's newly promulgated seismic ground motion parameter zoning map (GB18306-2015 "Seismic Ground Motion Parameter Zoning Map of China") under a magnitude four (4) earthquake, normative design methods under rare earthquakes have not been developed. It is thus highly desirable to develop a new, non-normative, method for assessing the performance-based seismic design.

SUMMARY

In view of the above-mentioned technical problems, the present disclosure provides a method for assessing a performance-based seismic design by setting a seismic risk. This assessment method starts from the exceedance probability of the performance level from the perspective of an inverse problem, configured to determine the structural performance level by setting the exceedance probability, determine the seismic demand when the performance level is constant, set the exceedance probability of the seismic demand in combination with the seismic risk of a set earthquake to finally determine the ground motion input and establish a novel probabilistic seismic risk assessment method that reaches the performance level.

In order to achieve the above objective, the present disclosure adopts the following technical solutions: a method for assessing a performance-based seismic design by setting a seismic risk, including the following steps:

S1, selecting, according to a characteristic of a seismic environment of a seismic design site, a plurality of ground motion records, and setting exceedance probabilities of different performance levels of a designed structure according to a control requirement of the seismic risk;

S2, setting the exceedance probabilities of different performance levels of the designed structure to determine seismic performance levels of different structures;

S3, solving a performance level of a single-degree-of-freedom system in a first period of the structure at different performance levels of the designed structure;

S4, inputting the plurality of ground motion records selected in step S1 into the single-degree-of-freedom system in the first period of the structure at different performance levels, repeatedly adjusting the plurality of ground motion records to allow a peak displacement response of the single-degree-of-freedom system in the first period of the structure to reach the performance level corresponding to the single-degree-of-freedom system in the first period, to obtain a peak acceleration and a seismic acceleration response spectrum value of each ground motion record at different performance levels;

S5, establishing a probability density function of the peak acceleration and the seismic acceleration response spectrum value of each ground motion record at different performance levels, i.e., calculating to obtain the probability density function of the peak acceleration and the seismic acceleration response spectrum value of each ground motion record at different performance levels;

S6, setting an exceedance probability of the peak acceleration and the seismic acceleration response spectrum value of each ground motion record, determining a determined value of the seismic acceleration response spectrum value and the peak acceleration of the each ground motion record, according to the determined value of the seismic acceleration response spectrum value and the peak acceleration of the each ground motion record, determining an annual exceedance probability function of an earthquake occurrence, wherein the annual exceedance probability function reaches the performance level;

S7, calculating a probabilistic seismic risk, wherein the probabilistic seismic risk reaches the performance level.

Further, the step S3 specifically includes:

S31, calculating, according to the designed structure, a structure period, a modal shape and a modal participation coefficient under different modal shapes;

S32, calculating contribution coefficients of different modal shapes with respect to any response magnitude, and setting a contribution threshold ε to determine a number of required modal shapes;

S33, synthesizing a structure seismic response effect based on a single-degree-of-freedom elastoplastic structural system using a first structure period as a measure;

S34, letting the structure seismic response effect be equal to the different performance levels of the designed structure, and solving the performance level of the single-degree-of-freedom system in the first period of the structure at different performance levels.

Further, in step S31, a dynamic characteristic analysis is performed on the designed structure by a dynamic characteristic equation, and the dynamic characteristic equation is as follows:

$$[k-\omega_n^2 m]\emptyset_n=0$$

where, k represents a stiffness matrix of the structure, $\emptyset_n$ represents a mode shape of the $n^{th}$ order modal shape, and $\omega_n$ represents a structural frequency of the $n^{th}$ order modal shape, then the structure period $T_n$ of the $n^{th}$ order modal shape equals to $$\frac{2\pi}{\omega_n},$$

the participation coefficient $\Gamma_n$ of the mode shape of the $n^{th}$ order modal shape equals to $$\frac{L_n^h}{M_n},$$

wherein $$L_n^h = \sum_{j=1}^{N} m_j \phi_{jn},$$

N represents the number of total orders of the modal shapes of the structure and also represents the total number of the modal shapes; $m_j$ represents the mass of the $j^{th}$ layer of the structure; and $\phi_{jn}$ represents a mode shape of the $j^{th}$ layer of the structure.

Further, in step S33, a square-root-sum-of-squares method or a complete quadratic combination method is configured to synthesize the structure seismic response effect.

Further, the step S6 specifically includes: setting an earthquake according to the characteristic of the seismic environment of the seismic design site; using a seismic risk analysis to establish a curve of the annual exceedance probability of the earthquake occurrence and the peak acceleration of the plurality of ground motion records, and a curve of the annual exceedance probability of the earthquake occurrence and the seismic acceleration response spectrum value of the plurality of ground motion records; determining the annual exceedance probability functions of the earthquake occurrence of the peak acceleration and the seismic acceleration response spectrum value of the plurality of ground motion records at different performance levels, respectively; setting a maximum value of the two functions as the annual exceedance probability function of the earthquake occurrence that reaches the performance level.

Further, in step S7, a Markov chain model is configured to calculate the probabilistic seismic risk that reaches the performance level.

Further, in step S7, the probabilistic seismic risk that reaches the performance level is equal to the set exceedance probability that reaches the performance level x the set exceedance probability of the peak acceleration and the seismic acceleration response spectrum value of the plurality of ground motion records x the annual exceedance probability of the earthquake occurrence that reaches the performance level.

The method for assessing the performance-based seismic design by setting a seismic risk of the present disclosure starts from the exceedance probability that reaches the performance level, determines the structural performance level by setting the exceedance probability, determines the seismic demand when the performance level is constant, sets the exceedance probability of the seismic demand in combination with the seismic risk of a set earthquake to finally determine the ground motion input and establish a novel probabilistic seismic risk assessment method that reaches the performance level, which is not completely consistent with the original purpose of the performance-based seismic design. Starting from the "performance-based level" is to grasp the design from the final result, and the main control and objective of the design are significantly enhanced.

DETAILED DESCRIPTION OF THE EMBODIMENTS

In order to clearly describe the objectives, technical solutions, and advantages of the present disclosure, the present disclosure will now be further described in detail hereinafter with reference to the embodiments. It is understood that the specific embodiments described herein are only intended to illustrate and not to limit the present disclosure.

A method for assessing a performance-based seismic design by setting a seismic risk of the present disclosure, including the following steps:

S1, a plurality of ground motion records are selected according to a characteristic of a seismic environment of a seismic design site, and exceedance probabilities of different performance levels of a designed structure are set according to a control requirement of the seismic risk;

S2, the exceedance probabilities of different performance levels of the designed structure are set to determine seismic performance levels of different structures.

The seismic performance level indicates a maximum degree of damage that may impact on the structure under the action of earthquake.

Indicators of the performance level include force, displacement, deformation, strain, ductility, energy and curvature. In the present embodiment, the displacement is selected as the indicator of the performance level, and the displacement reached by the designed structure is set to $D_{per}$ in accordance with the seismic code and the actual requirements.

S3, a performance level of a single-degree-of-freedom system in a first period of the structure at different performance levels of the designed structure is solved;

S31, a structure period, a modal shape and a modal participation coefficient under different modal shapes are calculated according to the designed structure;

In step S31, the structure period, the modal shape and the modal participation coefficient under different modal shapes are calculated by a dynamic characteristic equation, and the dynamic characteristic equation is as follows:

$$[k-\omega_n^2 m]\emptyset_n = 0$$

where, k represents a stiffness matrix of the structure, $\emptyset_n$ represents a mode shape of the $n^{th}$ order modal shape, and $\omega_n$ represents a structural frequency of the $n^{th}$ order modal shape, then the structure period $T_n$ of the $n^{th}$ order modal shape equals to $$\frac{2\pi}{\omega_n},$$

the participation coefficient $\Gamma_n$ of the mode shape of the $n^{th}$ order modal shape equals to $$\frac{L_n^h}{M_n},$$

wherein $$L_n^h = \sum_{j=1}^{N} m_j \phi_{jn},$$

N represents the number of total orders of the modal shapes of the structure and also represents the total number of the modal shapes; $m_j$ represents the mass of the $j^{th}$ layer of the structure; and $\phi_{jn}$ represents a mode shape of the $j^{th}$ layer of the structure.

S32, contribution coefficients of different modal shapes with respect to any response magnitude are calculated, the contribution threshold $\varepsilon$ is set to determine the number of required modal shapes;

The static value of the structure r caused by the external force S is set to $r^{st}$, then, the static value of the $n^{th}$ order modal shape is $r_n^{st}$, and the contribution of the $n^{th}$ order modal shape to $r^{st}$ is set to $$\bar{r}_n = \frac{r_n^{st}}{r^{st}}$$

to obtain the following formula:

$$\sum_{n=1}^{N} \bar{r}_n \leq \varepsilon$$

the number of required modal shapes is solved and obtained.

S33, the first structure period is used as a measure to synthesize the structure seismic response effect based on a single-degree-of-freedom elastoplastic structural system.

Corresponding to step S2, the selected seismic performance level is displacement, and the structure seismic response effect here is also selected as displacement.

The static value in the $n^{th}$ order modal shape is $r_n^{st} = \Gamma_n m \phi_n$, then the displacement in the $n^{th}$ order modal shape is $r_n(t) = r_n^{st}[\omega_n^2 D_n]$, and the following equation is obtained:

$$r_n(t) = r_n^{st}[\omega_n^2 D_n] = \Gamma_n m \phi_n [\omega_n^2 D_n] = \Gamma_n m \phi_n \frac{[\omega_n^2 D_n]}{[\omega_1^2 D_1]}[\omega_1^2 D_1] = \Gamma_n m \phi_n \frac{S_{an}}{S_{a1}}[\omega_1^2 D_1]$$

where, $S_{an}$ and $S_{a1}$ represent the spectral values of the $n^{th}$ structure period and the first structure period of the seismic acceleration response spectrum, respectively;

let $$\varphi_{an} = \frac{S_{an}}{S_{a1}},$$

then the following equation can be obtained:

$$r_n(t) = \Gamma_n m \emptyset_n \varphi_{an}[\omega_1^2 D]$$

In step S33, a square-root-sum-of-squares method or a complete quadratic combination method is configured to synthesize the structure seismic response effect, i.e., displacement.

The square-root-sum-of-squares method is expressed as follows:

$$r(t) = \left[\sum_{n=1}^{N}(r_n(t))^2\right]^{\frac{1}{2}} = \left[\sum_{n=1}^{N}(\Gamma_n m \emptyset_n \varphi_{an}\omega_1^2 D_1)^2\right]^{\frac{1}{2}}$$

The complete quadratic combination method is expressed as follows:

$$r(t) = \left(\sum_{i=1}^{N}\sum_{n=1}^{N}\rho_{in} r_i r_n\right)^{\frac{1}{2}}$$

where, $\rho_{in}$ represents a coupling coefficient of the modal shape and is expressed by the following equation:

$$\rho_{in} = \frac{8\zeta_i \zeta_n (1 + \lambda_T)\lambda_T^{1.5}}{(1 - \lambda_T^2)^2 + 4\zeta_i \zeta_n (1 + \lambda_T)^2 \lambda_T}$$

where, $\zeta_i$ and $\zeta_n$ represent the damping ratio of the $i^{th}$ mode shape and the damping ratio of the $n^{th}$ mode shape, respectively; $\rho_{in}$ represents a correlation coefficient between the $i^{th}$ structural frequency and the $n^{th}$ structural frequency; and $\lambda_T$ represents a ratio of the $i^{th}$ structural frequency to the $n^{th}$ structural frequency.

S34, the structure seismic response effect is set to be equal to the different performance levels of the designed structure, and the performance level of the single-degree-of-freedom system in the first period of the structure at different performance levels is solved.

S4, the plurality of ground motion records selected in step S1 are input into the single-degree-of-freedom system in the first period of the structure at different performance levels, the plurality of ground motion records is repeatedly adjusted to allow a peak displacement response of the single-degree-of-freedom system in the first period of the structure to reach the performance level corresponding to the single-degree-of-freedom system in the first period, to obtain a peak acceleration and a seismic acceleration response spectrum value of each ground motion record at different performance levels.

S5, a probability density function of the peak acceleration and the seismic acceleration response spectrum value of each ground motion record at different performance levels is established, i.e., the probability density function of the peak acceleration and the seismic acceleration response spectrum value of each ground motion record at different performance levels is obtained by calculating;

S6, an exceedance probability of the peak acceleration and the seismic acceleration response spectrum value of each ground motion record is set, a determined value of the seismic acceleration response spectrum value and the peak acceleration of the each ground motion record is determined, according to the determined value of the seismic acceleration response spectrum value and the peak acceleration of the each ground motion record, an annual exceedance probability function of the earthquake occurrence is determined, wherein the annual exceedance probability function reaches the performance level;

an earthquake is set according to the characteristic of the seismic environment of the seismic design site; a seismic risk analysis is configured to establish a curve of the annual exceedance probability of the earthquake occurrence and the peak acceleration of the plurality of ground motion records, and a curve of the annual exceedance probability of the earthquake occurrence and the seismic acceleration response spectrum value of the plurality of ground motion records; the annual exceedance probability functions of the earthquake occurrence of the peak acceleration and the seismic acceleration response spectrum value of the plurality of ground motion records at different performance levels are determined, respectively; a maximum value of the two functions is set as the annual exceedance probability function of the earthquake occurrence that reaches the performance level.

S7, a probabilistic seismic risk is calculated, wherein the probabilistic seismic risk reaches the performance level.

In step S7, a Markov chain model is configured to calculate the probabilistic seismic risk that reaches the performance level.

In the present disclosure, the seismic demand indicates the seismic acceleration response spectrum value and the peak acceleration of the plurality of ground motion records that reach the performance level.

The Markov probability model chain for setting the seismic risk includes: the set exceedance probability that reaches the performance level, the set exceedance probability of the seismic demand that reaches the performance level, and the annual exceedance probability of the earthquake occurrence that reaches the performance level. The probabilistic seismic risk assessment formula that reaches different performance levels is established based on the principle of total probability, namely, the probabilistic seismic risk that reaches the performance level is equal to the set exceedance probability that reaches the performance level x the set exceedance probability of the peak acceleration and the seismic acceleration response spectrum value of the plurality of ground motion records x the annual exceedance probability of the earthquake occurrence that reaches the performance level, i.e., the probabilistic seismic risk assessment formula is expressed as follows:

$$v_{DM}(n) = \int\int_{yx} \lambda_{IM}(n|y) dG_{EDP|DM}(y|x) |dG_{DM}(x)| dy dx$$

where, $V_{DM}(n)$ represents the seismic risk probability at different performance levels; the damage measure (DM) represents the performance level; n represents the number of different performance levels; $\lambda_{IM}(n|y)$ represents the annual exceedance probability of the earthquake occurrence at different performance levels; $dG_{EDP|DM}(y|x)$ represents the probability density function of the indicator EDP of the seismic demand at a given performance level (i.e. DM), and $dG_{DM}(x)$ represents the probability density function at a given performance level (i.e. DM).

According to the above formulas, the risk-based probability control is completed (by setting the exceedance probability of the structure at different performance levels and setting the exceedance probability of the seismic demand) to obtain the annual exceedance probability that reaches the performance level, so as to accomplish the performance-based seismic design assessment of the seismic risk.

The differences between the method of the present disclosure and the related research are as follows:

1) Difference from the seismic vulnerability analysis: The seismic vulnerability analysis is to determine the conditional probability of the seismic demand according to a given seismic intensity based on the seismic hazard analysis. In the present disclosure, the exceedance probability is set to determine the structural performance level, and the conditional probability of the seismic demand is determined when the performance level is constant.

2) Difference from existing flexible design method(s): In China, Europe and the United States, earthquake resistance is calculated based on the fortification intensity or ground motion parameters. In the present disclosure, both the performance level and the seismic demand need to set an exceedance probability as the probability control level of the seismic risk. Based on the performance level and scaling technology, the peak acceleration and the response spectrum intensity of the ground motion are determined as the ground motion input to calculate the seismic action.

3) Difference from the modal PUSHOVER analysis method: the modal PUSHOVER analysis (reference 40) proposed by Chopra et al. is based on the response spectrum of the normative design to input ground motion parameters. In the present disclosure, the input ground motion parameters are determined based on the performance level.

4) Difference from the ground motion scaling method of the modal PUSHOVER analysis method: Modal PUSHOVER scaling is to determine displacement targets based on the response spectrum of the normative design to perform ground motion scaling. In the scaling method of the present disclosure, the structural performance level is determined and converted to the single-degree-of-freedom system, and then the ground motion scaling is performed according to the structural performance level.

The method for assessing a performance-based seismic design by setting a seismic risk of the present disclosure, starts from the exceedance probability of the performance level (rather than the seismic risk analysis) from the perspective of an inverse problem, configured to determine the structural performance level by setting the exceedance probability, determine the seismic demand when the performance level is constant, set the exceedance probability of the seismic demand in combination with the seismic risk of a set earthquake to finally determine the ground motion input and establish a novel probabilistic seismic risk assessment method that reaches the performance level, which is not completely consistent with the original purpose of the "performance-based seismic design". Starting from the "performance-based level" is to grasp the design from the final result, and the main control and objective of the design are significantly enhanced.

It should be understood that those skilled in the art can make improvements or changes according to the above-mentioned description, and all these improvements and changes shall fall within the scope of protection of the appended claims of the present disclosure.

What is claimed is:

1. A method of assessing a performance-based seismic design of a designed structure under an action of an earthquake by setting a seismic risk, comprising the following steps:
    S1, selecting, according to a characteristic of a seismic environment of a seismic design site, a plurality of ground motion records, and setting a plurality of exceedance probabilities of different performance levels of the designed structure according to a control requirement of the seismic risk;
    S2, determining the different performance levels of the designed structure;
    S3, solving a single-degree-of-freedom system in a first period of the designed structure using the different performance levels of the designed structure to obtain a performance level;
    S4, inputting the plurality of ground motion records selected in step S1 into the single-degree-of-freedom system in the first period of the designed structure using the different performance levels, repeatedly adjusting the plurality of ground motion records to allow a peak displacement response of the single-degree-of-freedom system in the first period of the designed structure to reach the performance level obtained by solving the single-degree-of-freedom system in the first period, to obtain a peak acceleration and a seismic acceleration response spectrum value of each ground motion record of the plurality of ground motion records at the different performance levels;
    S5, obtaining a probability density function of the peak acceleration and a probability density function of the seismic acceleration response spectrum value of each ground motion record at the different performance levels;
    S6, setting an exceedance probability of the peak acceleration and the seismic acceleration response spectrum value of each ground motion record, determining a value of the seismic acceleration response spectrum value and a value of the peak acceleration of each ground motion record; according to the value of the seismic acceleration response spectrum value and the value of the peak acceleration of each ground motion record, determining an annual exceedance probability function of an earthquake occurrence, wherein the annual exceedance probability function reaches the performance level obtained by solving the single-degree-of-freedom system;
    S7, calculating a probabilistic seismic risk, wherein the probabilistic seismic risk reaches the performance level obtained by solving the single-degree-of-freedom system; wherein the performance level indicates a maximum degree of damage impacted on the designed structure under the action of the earthquake; and assessing the performance-based seismic design of the designed structure under the action of the earthquake by using the probabilistic seismic risk.

2. The method according to claim 1, wherein step S3 comprises:
    S31, calculating, according to the designed structure, a structure period, a modal shape and a modal participation coefficient under a plurality of modal shapes;
    S32, calculating a plurality of contribution coefficients of the plurality of modal shapes with respect to a response magnitude, setting a contribution threshold ε to determine a number of required modal shapes of the plurality of modal shapes;
    S33, synthesizing a structure seismic response effect based on a single-degree-of-freedom elastoplastic structural system using a first structure period as a measure; and
    S34, letting the structure seismic response effect be equal to each one of the different performance levels of the designed structure, and obtaining the performance level by solving the single-degree-of-freedom system in the first period of the designed structure at the different performance levels.

3. The method according to claim 2, wherein, in step S31, a dynamic characteristic analysis is performed on the designed structure by a dynamic characteristic equation as follows:

$$[k-\omega_n^2 m]\emptyset_n=0$$

wherein, k represents a stiffness matrix of the designed structure, $\emptyset_n$ represents a mode shape of an $n^{th}$ order modal shape of the plurality of modal shapes, and $\omega_n$ represents a structural frequency of the $n^{th}$ order modal shape, wherein a structure period of the $n^{th}$ order modal shape is $$T_n = \frac{2\pi}{\omega_n},$$

and the modal participation coefficient of the mode shape of the $n^{th}$ order modal shape is $$\Gamma_n = \frac{L_n^h}{M_n},$$

wherein $$L_n^h = \sum_{j=1}^{N} m_j \phi_{jn},$$

N represents a number of total orders of the plurality of modal shapes of the designed structure and also represents a total number of the plurality of modal shapes; $m_j$ represents a mass of a $j^{th}$ layer of the designed structure; and $\phi_{jn}$ represents a mode shape of the $j^{th}$ layer of the designed structure.

4. The method according to claim 2, wherein, in step S33, a square-root-sum-of-squares method or a complete quadratic combination method is configured to synthesize the structure seismic response effect.

5. The method according to claim 1, wherein step S6 comprises:

setting an earthquake occurrence according to the characteristic of the seismic environment of the seismic design site;

using a seismic risk analysis to establish a first curve of an annual exceedance probability of the earthquake occurrence and the peak acceleration of each ground motion record, and a second curve of an annual exceedance probability of the earthquake occurrence and the seismic acceleration response spectrum value of each ground motion record;

determining two annual exceedance probability functions of the earthquake occurrence of the peak acceleration and the seismic acceleration response spectrum value of each ground motion record at the different performance levels, respectively;

setting a maximum value of the two annual exceedance probability functions as the annual exceedance probability function of the earthquake occurrence.

6. The method according to claim 1, wherein, in step S7, a Markov chain model is configured to calculate the probabilistic seismic risk.

7. The method according to claim 6, wherein, in step S7, the probabilistic seismic risk is equal to each of the plurality of exceedance probabilities of the different performance levels of the designed structure multiplied by the exceedance probability of the peak acceleration and the seismic acceleration response spectrum value of each ground motion record and multiplied by the annual exceedance probability of the earthquake occurrence, wherein each of the plurality of exceedance probabilities of the different performance levels of the designed structure and the annual exceedance probability of the earthquake occurrence reach the performance level obtained by solving the single-degree-of-freedom system.

* * * * *